(12) United States Patent
Ishihara et al.

(10) Patent No.: US 7,135,053 B2
(45) Date of Patent: Nov. 14, 2006

(54) BRITTLE FORMED PRODUCT AND IRON-BASED POWER MATERIAL AND METHOD FOR MANUFACTURING THESE MATERIALS

(75) Inventors: Masataka Ishihara, Nara (JP); Akio Maemoto, Yamatokoriyama (JP); Mitsuma Matsuda, Kagawa (JP); Yoshihiro Seo, Nara (JP); Shouichi Kashino, Tokushima (JP)

(73) Assignee: Koyo Seiko Co., Ltd., Osaka (JP)

( * ) Notice: Subject to any disclaimer, the term of this patent is extended or adjusted under 35 U.S.C. 154(b) by 303 days.

(21) Appl. No.: 10/130,996

(22) PCT Filed: Oct. 1, 2001

(86) PCT No.: PCT/JP01/08659

§ 371 (c)(1),
(2), (4) Date: Sep. 4, 2002

(87) PCT Pub. No.: WO02/29123

PCT Pub. Date: Apr. 11, 2002

(65) Prior Publication Data

US 2003/0075014 A1   Apr. 24, 2003

(30) Foreign Application Priority Data

| Oct. 2, 2000 | (JP) | ............... 2000-302339 |
| Oct. 2, 2000 | (JP) | ............... 2000-302340 |
| Oct. 11, 2000 | (JP) | ............... 2000-310747 |

(51) Int. Cl.
B22F 1/00 (2006.01)
C22B 1/243 (2006.01)
C22C 49/14 (2006.01)

(52) U.S. Cl. ............... 75/252; 75/316; 75/317; 75/318; 75/771; 419/66

(58) Field of Classification Search ............... 75/252, 75/316–318, 771; 419/66
See application file for complete search history.

(56) References Cited

U.S. PATENT DOCUMENTS

| 1,923,803 A | * | 8/1933 | Trent ............... 75/320 |
| 2,445,648 A | | 7/1948 | Truesdale |
| 3,870,507 A | | 3/1975 | Allen |
| 3,870,509 A | * | 3/1975 | Allen ............... 75/433 |
| 4,075,027 A | * | 2/1978 | Knill et al. ............... 106/643 |
| 4,369,062 A | * | 1/1983 | Strange ............... 75/317 |
| 4,585,475 A | * | 4/1986 | Fosnacht ............... 75/544 |
| 5,556,457 A | | 9/1996 | Terza et al. |
| 6,120,577 A | * | 9/2000 | Koros et al. ............... 75/483 |

FOREIGN PATENT DOCUMENTS

| DE | 44 32 721 | 3/1996 |
| JP | 59-59841 | 4/1984 |
| JP | 60-145334 | 7/1985 |
| JP | 61-288023 | 12/1986 |
| JP | 6-287648 | 10/1994 |
| JP | 2000-17344 | 1/2000 |
| JP | 2001-310259 | 11/2001 |

OTHER PUBLICATIONS

International Search Report issued for PCT/JP01/08659 dated Dec. 25, 2001.
International Search Report issued for PCT/JP01/06849 dated Nov. 20, 2001.
Patent Abstract of Japan for 7-97638, dated Apr. 11, 1995.
Patent Abstract of Japan for 51-147418, dated Dec. 17, 1976.
Patent Abstract of Japan for 56-23237, dated Mar. 5, 1981.
Patent Abstract of Japan for 9-118937, dated May 6, 1997.

* cited by examiner

*Primary Examiner*—Ngoclan T. Mai
(74) *Attorney, Agent, or Firm*—Smith, Gambrell & Russell, LLP

(57) ABSTRACT

Cotton-like aggregates (B) including grinding chips from an iron-based metal and a grinding fluid containing oil and water are compression molded for forming a brittle compact (C) having the fibrous grinding chips roughly sheared and excessive water and oil removed therefrom. The brittle compact (C) is crushed for further finely shearing the grinding chips and the resultant grinding chips are mixed with a solidification assistant (D) for producing an iron-based powder material (E) containing the solidification assistant (D).

19 Claims, 4 Drawing Sheets

*Fig. 2*
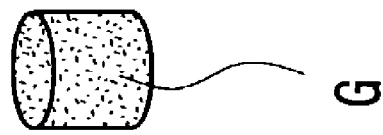
(c)
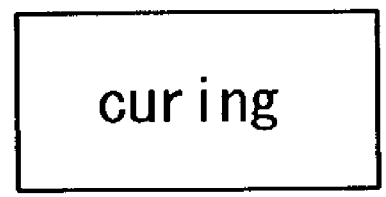
(b)
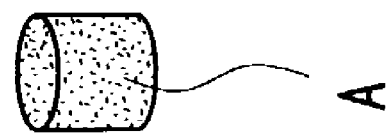
(a)

BRITTLE FORMED PRODUCT AND IRON-BASED POWER MATERIAL AND METHOD FOR MANUFACTURING THESE MATERIALS

TECHNICAL FIELD

The present invention relates to a brittle compact and an iron-based powder material, and a method for producing the same, and more particularly to a technique for effectively utilizing grinding chips from an iron-based metal.

BACKGROUND ARTS

Grinding chips which occur in the machining of an iron-based metal such as bearing steel, carburized steel and the like (hereinafter, the term "machining" will be used to represent a concept also including grinding, super-finishing grinding, lapping and the like) are recovered in the form of cotton-like (fibrous) aggregates including a grinding fluid containing water and oil, abrasive grains, and the like. Since the cotton-like aggregates contain a considerable quantity of pure iron, there have been made attempts to reuse the aggregates as steelmaking material. Unfortunately, however, the cotton-like aggregates contain such a large quantity of water as to cause bumping (phreatic explosion) if the aggregates are directly charged into a blast furnace. It may be contemplated to remove the water from the cotton-like aggregates by centrifugation or the like. In this case, however, the oil contained in the cotton-like aggregates is also removed along with the water and hence, the pure iron as a component of the grinding chips is converted to iron oxide due to the self heating of the cotton-like aggregates. Therefore, the resultant aggregates need be reduced so as to be reused as steelmaking material. The use of a reducing agent results in increased costs.

On the other hand, the grinding chips with the oil adhered thereto are less prone to adhere to each other. In the case of cotton-like aggregates containing a large quantity of grinding chips from an iron-based metal containing not less than 0.2 wt % of carbon, great springback is encountered when the aggregates are compression molded. Hence, the compression molding of the cotton-like aggregates involves difficulty about accomplishing solidification to a desired strength. Accordingly, if such compacted cotton-like aggregates are charged into the blast furnace, the aggregates are scatteringly carried upward so that most of them is collected by a dust collector.

In addition, the fibrous grinding chips contained in the cotton-like aggregates are hard to crush by means of a hammer mill or the like and hence, the cotton-like aggregates cannot be sheared finely. This leads to a difficulty of processing the cotton-like aggregates into briquettes or the like.

In reality, therefore, the cotton-like aggregates are not put to reuse but committed to a waste processing contractor for landfill disposal.

In a steel making process including a smelting step and the like, on the other hand, there occur dusts bearing iron and heavy metals. Hence, it is a general practice to collect such dusts as recovery dusts (OG dusts) (see, for example, Unexamined Japanese Patent Publication No.7 (1995)-97638). Unfortunately, if such recovery dusts are directly charged into the blast furnace, the dusts are scatteringly carried upward to be collected by the dust collector again. As a result, the dusts are not put to reuse but committed to the landfill disposal.

However, the landfill disposal is undesirable from the standpoint of the effective utilization of resources. Furthermore, the landfill disposal entails the environmental deterioration as well as the increase of the disposal costs. The recovery dusts, in particular, requires an even greater disposal cost because the dusts contain heavy metals and must be committed to the landfill disposal as special industrial wastes.

It is an object of the invention to provide a brittle compact and iron-based powder material providing an effective reuse of grinding chips, as well as a method for producing the same.

It is another object of the invention to provide an iron-based powder material providing an effective reuse of the grinding chips together with the recovery dusts, as well as a method for producing the same.

DISCLOSURE OF THE INVENTION

A brittle compact according to the invention is formed by compression molding cotton-like aggregates into a predetermined shape, the cotton-like aggregates including grinding chips from an iron-based metal and a grinding fluid containing oil and water. According to the brittle compact thus composed, the cotton-like aggregates are compression molded to form the compact so that the compact has brittleness originating in the sheared fibrous grinding chips. Furthermore, the brittle compact contains a substantial quantity of pure iron because the residual oil prevents the oxidization of the pure iron as a component of the grinding chips. Therefore, processing the cotton-like aggregates into powder provides the reuse thereof as material for forming high-quality steelmaking briquettes or for sintered metals, thus contributing to the environmental conservation and the reduced disposal costs of the grinding chips.

The above brittle compact may be formed by solidification using a solidification assistant. In this case, the brittle compact can be solidified to a desired strength, so that the brittle compact is hard to collapse, facilitating the handlings thereof including transportation, storage and the like.

It is preferred that the solidification assistant is at least one selected from the group consisting of coloidal silica, silicate of soda, aluminum phosphate, and asphalt emulsion. This provides a brittle compact which is rigidly solidified despite the presence of the oil. Therefore, the brittle compact becomes harder to collapse, featuring easier handlings thereof including transportation, storage and the like.

The brittle compact may preferably contain oil in concentrations of 1 to 5 wt %. In this case, the brittle compact can be solidified to a proper hardness and is adapted for effective suppression of the oxidization of the pure iron as a component of the grinding chips by means of the minimum possible amount of residual oil.

A method for producing a brittle compact according to the invention is characterized in that cotton-like aggregates including grinding chips from an iron-based metal and a grinding fluid containing oil and water are compression molded thereby forming a brittle compact of a predetermined shape in which the fibrous grinding chips are sheared and excessive water and oil are removed.

According the production method for brittle compact thus arranged, the fibrous grinding chips, which are hard for the conventional method to shear, can be readily sheared by compression molding the cotton-like aggregates. On the other hand, the compression molding is performed as retaining the oil in the grinding fluid so that the oxidization of the pure iron as a component of the grinding chips is suppressed.

Accordingly, the brittle compact containing a large quantity of pure iron can be produced in an easy and assured manner.

The above method for producing the brittle compact may further comprise the step of impregnating the brittle compact with a solidification assistant. In this case, a brittle compact solidified to a desired strength can be produced. Thus is obtained the brittle compact which is hard to collapse, facilitating the handlings thereof including transportation, storage and the like.

It is preferred that the solidification assistant is at least one selected from the group consisting of coloidal silica, silicate of soda, aluminum phosphate, and asphalt emulsion. This provides a brittle compact which is more rigidly solidified despite the presence of the oil. Therefore, the brittle compact becomes even harder to collapse, featuring easier handlings thereof including transportation, storage and the like.

Furthermore, it is preferred that the solidification assistant is impregnated in concentrations of 2 to 30 wt %. This provides a brittle compact which is even more rigidly solidified. Therefore, the brittle compact becomes much harder to collapse, featuring much easier handlings thereof including transportation, storage and the like.

According to the method for producing the brittle compact, it is preferred that the above cotton-like aggregates are those adjusted for the content of water to not more than 50 wt % and for the content of oil to not more than 10 wt %. This results in easy handlings, such as transportation and the like, of the cotton-like aggregates and also permits excessive water and oil to be readily and properly removed from the brittle compact only by compression molding.

According to the method for producing the brittle compact, it is preferred that the brittle compact is adjusted for the content of water to 2 to 12 wt % and for the content of oil to 1 to 5 wt %. In this case, the brittle compact can be solidified to a proper hardness and is adapted for effective suppression of the oxidization of the pure iron as a component of the grinding chips by means of the minimum possible amount of residual oil.

As the grinding chips, there may be employed those containing not less than 0.2 wt % of carbon. The compression molding also permits grinding chips having such a great springback to be effectively sheared, eliminating the influence of the springback.

An iron-based powder material according to the invention comprises iron-based powder and oil, the powder material produced by crushing a brittle compact formed by compression molding cotton-like aggregates including grinding chips from an iron-based metal and a grinding fluid containing oil and water.

According to the iron-based powder material thus composed, a large quantity of pure iron is present because the oxidization of the pure iron as a component of the iron-based powder material is suppressed by the oil contained therein. Furthermore, the iron-based powder is in the form of fine particles because the cotton-like aggregates are pulverized by compression molding. Accordingly, the inventive material can be reused as powder material for forming high-quality steelmaking briquettes or for sintered metals, thus contributing to the environmental conservation as well as to the reduced disposal costs of the grinding chips.

The above iron-based powder material may further comprise a solidification assistant. In this case, the powder material can be solidified to a desired strength and into a desired shape simply by compression molding. Accordingly, the reuse of the grinding chips can be further promoted.

It is preferred that the solidification assistant is at least one selected from the group consisting of rice polishings, blackstrap molasses, starches, calcined lime, coloidal silica, silicate of soda, aluminum phosphate, vinyl acetate sludge, asphalt emulsion, and bentonite. This permits the powder material to be rigidly solidified despite the presence of the oil. Therefore, the reuse of the grinding chips is promoted even further.

The above iron-based powder material may further comprise coke. In this case, the powder material can be rigidly solidified by compression molding. In this case, it is further preferred that the powder material contains coke in concentrations of 5 to 50 wt %. This permits the powder material to be solidified more rigidly.

The above iron-based powder material may further comprise recovery dusts collected in a steelmaking process. In this case, the grinding chips together with the recovery dusts can be reused. This contributes not only to the environmental conservation but also to the reduced disposal costs of the recovery dusts. In this case, it is further preferred that the powder material contains the recovery dusts in concentrations of 10 to 30 wt %. This permits the powder material to be solidified to a desired hardness.

A method for producing an iron-based powder material according to the invention comprises the steps of: compression molding cotton-like aggregates including grinding chips from an iron-based metal and a grinding fluid containing oil and water thereby forming a brittle compact having the fibrous grinding chips roughly sheared and excessive water and oil removed therefrom; and crushing the brittle compact for further finely shearing the grinding chips thereby producing the powder material containing the iron-based powder and oil.

According to the production method for iron-based powder material thus arranged, the fibrous grinding chips, which are hard for the conventional method to shear, can be roughly sheared in an easy way of compression molding the cotton-like aggregates. Furthermore, since the rough shearing of the fibrous grinding chips is previously done in this manner, the grinding chips can be readily and effectively sheared in the step of crushing the brittle compact. Hence, the iron-based powder in fine particles can be produced in an easy and assured manner. In addition, the oxidization of the pure iron as a component of the grinding chips can be suppressed because the aforesaid steps are performed as retaining the oil contained in the grinding fluid. This provides an easy and positive production of the iron-based powder in fine particles containing a large quantity of pure iron.

In the above method for producing the iron-based powder material, a solidification assistant may be admixed at the time when or after the brittle compact is crushed. In this case, there is obtained an iron-based powder material capable of being solidified to a desired strength and into a desired shape simply by compression molding. Accordingly, the reuse of the grinding chips can be further promoted.

It is preferred that the above solidification assistant is at least one selected from the group consisting of rice polishings, blackstrap molasses, starches, calcined lime, coloidal silica, silicate of soda, aluminum phosphate, vinyl acetate sludge, asphalt emulsion and bentonite. This provides an iron-based powder material capable of being readily and rigidly solidified despite the presence of the oil. Thus, the reuse of the grinding chips can be even further promoted.

It is further preferred that the solidification assistant is admixed in concentrations of 2 to 30 wt %. This provides an iron-based powder material capable of being solidified even more rigidly.

According to the above method for producing the iron-based powder material, coke may be admixed at the time when or after the brittle compact is crushed. In this case, there can be produced an iron-based powder material capable of being quite rigidly solidified by virtue of the coke. In this case, it is further preferred that the solidification assistant is admixed in concentrations of 1 to 10 wt %. In this case, there can be produced an iron-based powder material capable of being readily and stably solidified. Furthermore, it is preferred that the coke is admixed in concentrations of 5 to 50 wt %. In this case, there can be produced an iron-based powder material capable of being more rigidly compression molded.

According to the above method for producing the iron-based powder material, recovery dusts collected in a steelmaking process may be admixed at the time when or after the brittle compact is crushed. In this case, there can be produced an iron-based powder material containing the recovery dusts. Hence, the recovery dusts together with the grinding chips can be reused as solidified. This contributes to the environmental conservation as well as to the reduced disposal costs of the recovery dusts. In this case, it is further preferred that the recovery dusts are admixed in concentrations of 10 to 30 wt %. This provides an iron-based powder material capable of being compression molded to a desired hardness.

According to the above method for producing the iron-based powder material, it is preferred that the cotton-like aggregates are those adjusted for the content of water to not more than 50 wt % and for the content of oil to not more than 10 wt %. This results in easy handlings, such as transportation and the like, of the cotton-like aggregates and also permits excessive water and oil to be readily and properly removed from the brittle compact only by compression molding.

According to the above method for producing the iron-based powder material, it is preferred that the brittle compact is adjusted for the content of water to 2 to 12 wt % and for the content of oil to 1 to 5 wt %. In this case, the brittle compact can be solidified to a suitable hardness whereas the oxidization of the pure iron as a component of the grinding chip can be effectively suppressed by means of the minimum possible amount of residual oil.

As the grinding chips, there may be employed those containing not less than 0.2 wt % of carbon. The compression molding also permits grinding chips having such a great springback to be effectively sheared, eliminating the influence of the springback.

BRIEF DESCRIPTION OF THE DRAWINGS

FIG. 2 is a group of diagrams showing steps of a method for producing an iron-based powder material and a briquette from the brittle compact;

BEST MODES FOR CARRYING OUT THE INVENTION

Figure 1:
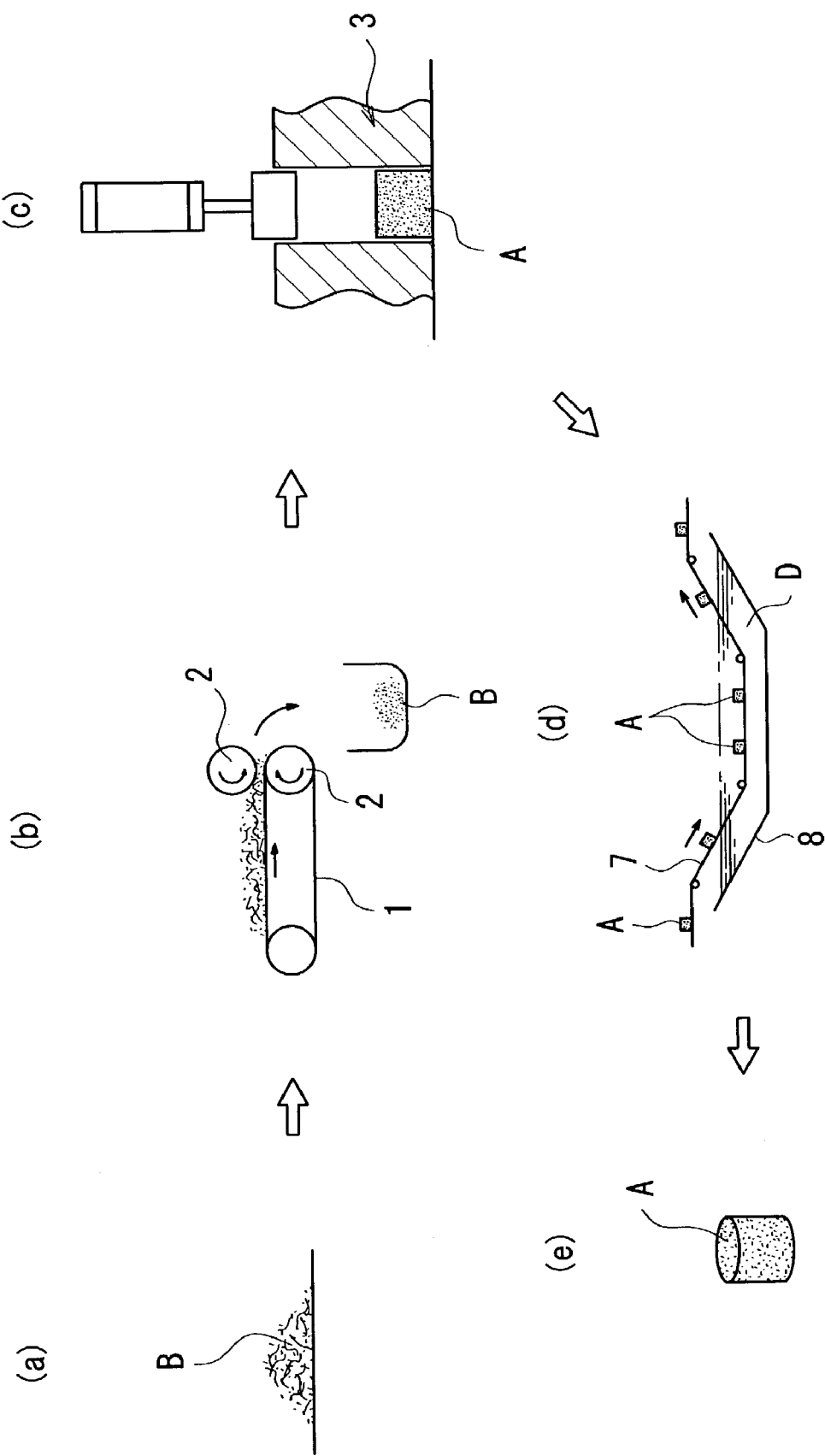
FIG. 1 is a group of diagrams showing steps of a method for producing a brittle compact according to one embodiment of the invention.

FIG. 1 is a group of diagrams showing steps of a method for producing a brittle compact according to one embodiment of the invention. According to the method for producing a brittle compact A, cotton-like aggregates B (see FIG. 1a) of grinding chips produced in the machining of an iron-based metal are first compression molded for preparatory adjustment of the contents of water and oil which are components of a grinding fluid contained in the cotton-like aggregates B. The compression molding of the cotton-like aggregates B is performed by, for example, clamping the aggregates B between a pair of rollers 2 as carrying the same on a belt conveyor 1 (see FIG. 1b). However, the contents of water and oil may also be adjusted simply by applying air blow or by air compression. It is preferred in this process that the cotton-like aggregates B are adjusted for the content of water to not more than 50 wt % and for the content of oil to not more than 10 wt %. This facilitates the handlings, such as transportation, storage and the like, of the cotton-like aggregates B.

Next, the cotton-like aggregates B thus adjusted for the contents of water and oil are compression molded in a mold 3 using a press, for example, thereby forming a brittle compact A (see FIG. 1c). The grinding chips of spiral fiber contained in the cotton-like aggregates B are sheared by the compression molding. Furthermore, the compression molding also removes excessive water and oil so that the brittle compact A is adjusted for the content of water to 2 to 12 wt % and for the content of oil to 1 to 5 wt %. This permits the minimum possible amount of residual oil to effectively suppress the oxidization of pure iron as a component of the grinding chips. Furthermore, the cotton-like aggregates B have been adjusted for the content of water to not more than 50 wt % and for that of oil to not more than 10 wt % in the pervious step and hence, the proportions of water and oil in the brittle compact A can be easily and properly adjusted only by the compression molding.

The brittle compact A is formed in a shape easy to handle, such as circular cylinder, sphere, prism or the like, and is compacted to such a strength as not to collapse during transportation.

Next, the brittle compact A is impregnated with a solidification assistant D in liquid form. The impregnation with the solidification assistant D is performed by, for example, immersing the brittle compact A in the solidification assistant D filled in a tank 8 as carrying the compact on a belt conveyor 7 (see FIG. 1d). The solidification assistant D used in this embodiment may preferably be at least one selected from the group consisting of coloidal silica, silicate of soda, aluminum phosphate, and asphalt emulsion. Such a solidification assistant provides easy and rigid solidification of the brittle compact A. The solidification assistant D may preferably be impregnated in concentrations of 2 to 30 wt %. This results in an even more rigidly solidified brittle compact A.

The brittle compact A thus obtained retains a part of the oil of the grinding fluid at all times including the processing period so that the oxidization of the pure iron as a component of the grinding chips is effectively suppressed. Therefore, the brittle compact can be favorably reused as a material for forming briquettes for use as steelmaking material. As shown in FIG. 2 for example, a steelmaking briquette G (see FIG. 2c) can be produced by curing (drying) the brittle compact A (see FIG. 2a) impregnated with the solidification assistant D for removal of the water contained therein (see FIG. 2b). It is preferred to perform the curing for about two days in the light of the assured removal of the contained water. The curing may be performed by allowing the briquette to dry at normal temperatures. Otherwise, the briquette may be dried by applying air blow.

The resultant briquette G is produced by drying the brittle compact A, so that there is no fear of causing bumping or of being scatteringly carried upward to be discharged if the briquette is directly charged into the blast furnace. Furthermore, the oxidization of the pure iron is effectively suppressed because the processing is performed in a manner to retain a part of the oil of the grinding fluid at all times. As to a briquette G formed from cotton-like aggregates B containing grinding chips from a bearing steel (SUJ-2), for example, it is confirmed that the pure iron is present in concentrations of 70 wt % or more. Therefore, the briquette G presents quite a high smelting yield of not less than 90%, thus being worthy of a high-quality steelmaking material which can be offered to steel makers for pay. Furthermore, the briquette is in the solid form, facilitating the transportation and other handlings thereof.

In addition, the method for producing the briquette G features an efficient production because the method is adapted to solidify the cotton-like aggregates B without the step of crushing the cotton-like aggregates B into fine particles.

The brittle compact A may not be impregnated with the solidifying assistant D. In this case, the following procedure may be taken to form the briquette G for use as steelmaking material. Specifically, the brittle compact A formed by the compression molding shown in FIG. 1c together with the solidification assistant D are charged in a mixer 5 equipped with a chopper having rotary blades 4 (or a Henschel mixer) for crushing (see FIG. 3a). This further finely shears the grinding chips in the brittle compact A (finishing shearing) thereby offering an iron-based powder material E containing iron powder of pure iron, the oil and the solidification assistant D (see FIG. 3b). The iron powder has a greater diameter of the order of 3 to 1000 μm. In the crushing of the brittle compact A, the finishing shearing of the fibrous grinding chips in the brittle compact A can be done smoothly because the fibrous grinding chips have been sheared previously. In a case where the fibrous grinding chips in the brittle compact A are not previously sheared the crushing of the grinding chips by means of the mixer 5 equipped with the chopper (or the Henschel mixer) takes such a long time that economic merits cannot be obtained. In addition, it is difficult to obtain fine iron-based powder. In the iron-based powder material E thus produced, as well, the oxidization of the pure iron, which is a component of the powder material, is effectively suppressed because a part of the oil in the grinding fluid is retained at all times including the processing period.

As the solidification assistant D, there may preferably be employed one or more than one selected from the group consisting of rice polishings; blackstrap molasses such as from sugar cane; starches such as potato starch, corn starch and the like; calcined lime; coloidal silica; silicate of soda; aluminum phosphate; vinyl acetate sludge; asphalt emulsion; and bentonite. Such a solidification assistant D may preferably be present in concentrations of 2 to 30 wt %. The rice polishings and blackstrap molasses are particularly preferred as the solidification assistant D because they effectively accelerates the solidification of the iron-based powder material E and are less costly. After kneading, the asphalt emulsion is separated into an asphalt component and water, the asphalt component presenting caking which develops strength. Anionic asphalt is preferably used in the asphalt emulsion.

Subsequently, a predetermined amount of the above iron-based powder material E is compression molded by means of a roll-type molding machine or a cylinder-type molding machine 6 (see FIG. 3c), thereby forming a briquette F substantially shaped like a pillow and containing a large quantity of pure iron. In the compression molding of the iron-based powder material E, the pure iron powder with oil adhered thereto are firmly bonded together via the water contained in the solidification assistant D and iron-based powder material E whereby the powder material E can be solidified. Particularly, in a case where the iron-based powder material E contains 5 to 6 wt % of water, 4 wt % of rice polishings and 2 wt % of blackstrap molasses or where the iron-based powder material E contains 7 to 15 wt % of water and 2 to 10 wt % of vinyl acetate sludge, there may be produced a briquette F more rigidly solidified.

Figure 3:
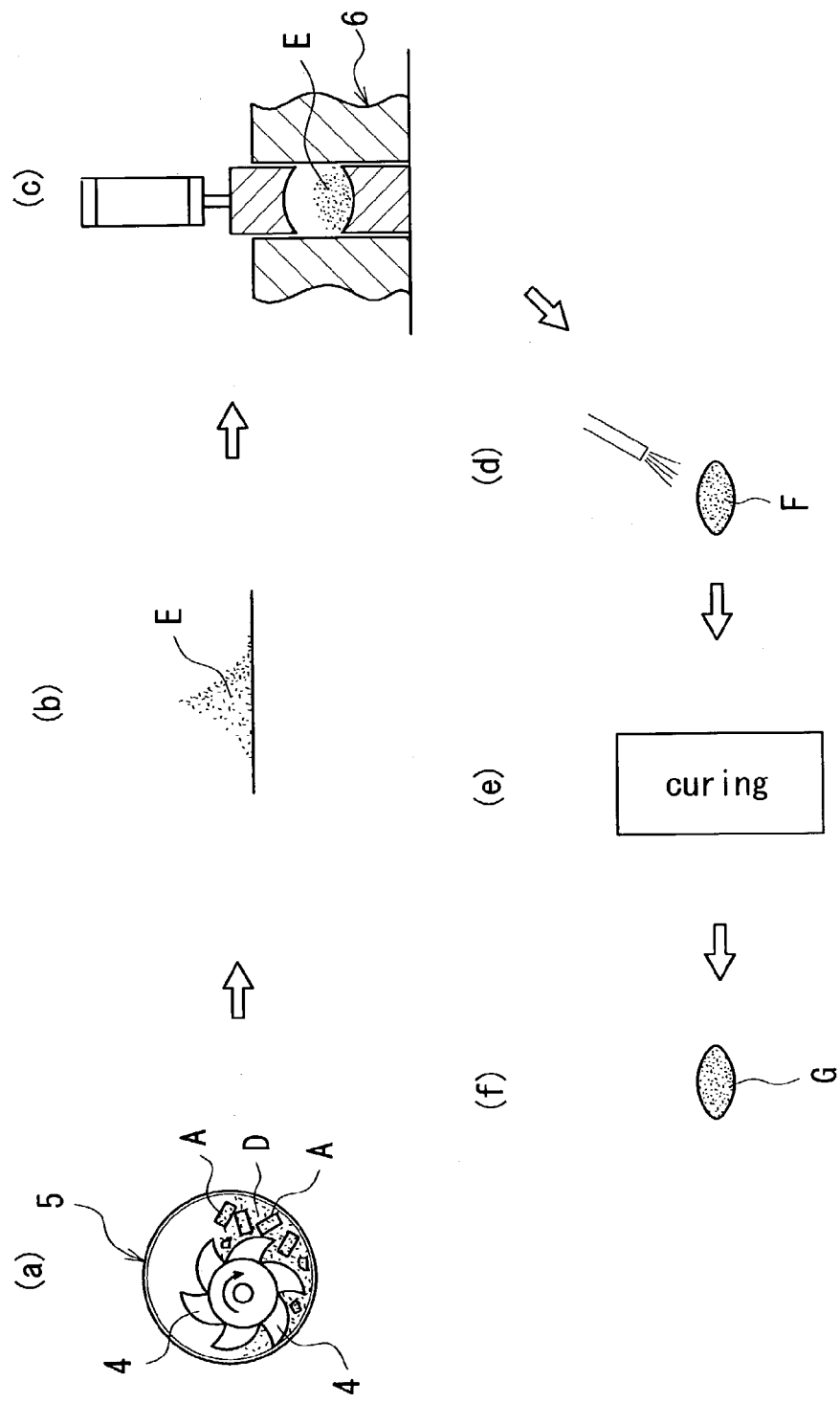
FIG. 3 is a group of diagrams showing steps of another method for producing a briquette from the brittle compact.

Immediately after the compression molding, the briquette F is subjected to quick cooling by applying thereto air blow at normal temperatures or cooled air blow (see FIG. 3d). This provides an easy and stable solidification of the briquette F. Subsequently, the briquette F is cured (dried) for removal of the water contained therein (see FIG. 3e) thereby giving the briquette G for use as steel making material (see FIG. 3f). It is preferred to perform the curing of the briquette for about two days in the light of the assured removal of the contained water.

In the above step of crushing the brittle compact A, the brittle compact together with the solidification assistant D, coke and recovery dusts produced and collected in the steelmaking process may be charged into the mixer 5 equipped with the chopper (or the Henschel mixer). In this case, it is preferred to blend together 50 to 70 wt % of brittle compact A, 5 to 50 wt % of coke K, 10 to 30 wt % of recovery dusts and 1 to 10 wt % of solidification assistant D. This provides iron-based powder material E containing the pure iron, coke, recovery dudsts and solidification assistant D. This production method, in particular, provides an iron-based powder material E capable of being more rigidly solidified because the coke and the solidification assistant are admixed in concentrations of 5 to 50 wt % and of 1 to 10 wt %, respectively. Furthermore, since the mixing ratio of the recovery dusts is 10 to 30 wt %, it is easy to produce an iron-based powder material E capable of being solidified to a desired hardness. As the recovery dusts, for example, there may be employed those containing 10 to 55 wt % of iron (total Fe) which are produced and collected in the steelmaking process.

The above methods for producing the brittle compact A and the iron-based powder material E are particularly favorably applied to the reuse of grinding chips containing not less than 0.2 wt % of carbon. Such grinding chips present a great springback and hence, are hard to solidify. However, the application of the inventive compression molding shown in FIG. 1c permits the grinding chips to be effectively sheared, while eliminating the influence of the springback. A typical example of the grinding chips containing not less than 0.2 wt % of carbon includes grinding chips from a bearing steel.

Figure 4:
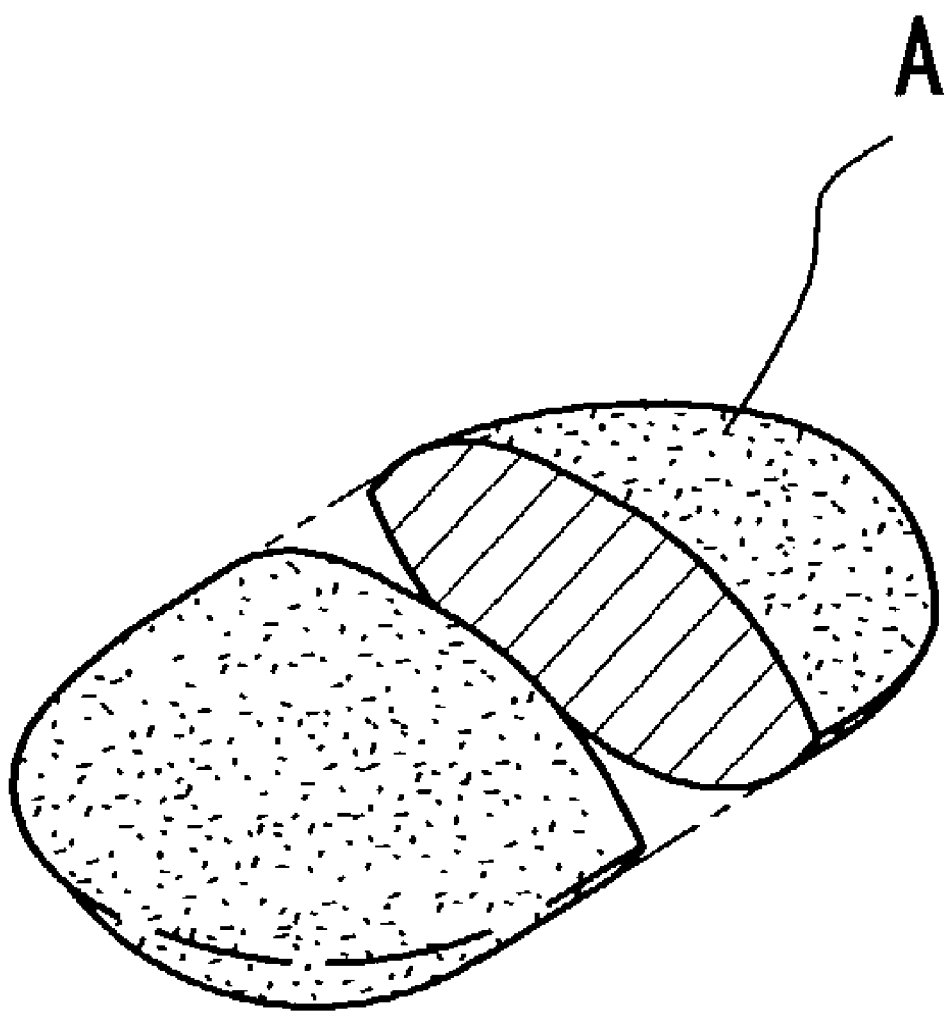
FIG. 4 is a partially cut-away perspective view showing another configuration of the brittle compact.

Besides the aforesaid circular cylinder shape, the brittle compact A may also take a substantially pillow-like shape, such as of eggs, almond, rugby ball and the like. The pillow-like shape has a rounded circumferential edge and is gradually increased in thickness from the circumferential edge toward its center (see FIG. 4). Formed in such a shape, the brittle compact becomes harder to collapse withstanding the compressive load and is also less prone to incur partial fracture at a corner portion thereof or the like.

It is noted that the invention is not limited to the foregoing embodiments. For instance, the crushing of the brittle compact A may be followed by blending the resultant powdery material with the solidification assistant D, powdery coke and recovery dusts, although the crushing of the brittle compact A is performed in parallel with the admixing of the solidification assistant D, coke and recovery dusts according to the foregoing embodiments.

Further, the solidification assistant D, coke and recovery dusts may be selectively admixed. Otherwise, the invention may be carried out with admixing none of the solidification assistant D, coke and recovery dusts. In this case, there is produced an iron-based powder material E consisting of an iron-based powder material and oil.

The above iron-based powder material E may be reused not only as material for forming the steelmaking briquette G but also as a powdery material for sintered metal or as a magnetic material to be added in resins and the like.

What is claimed is:

1. A method for producing a brittle compact comprising compression molding cotton-like aggregates including grinding chips from an iron-based metal and a grinding fluid containing oil and water thereby forming a brittle compact of a predetermined shape in which the grinding chips are sheared and excessive water and oil are removed, and impregnating said brittle compact with a solidification assistant.

2. The method for producing the brittle compact as claimed in claim 1, wherein said solidification assistant is at least one selected from the group consisting of coloidal silica, silicate of soda, aluminum phosphate, and asphalt emulsion.

3. The method for producing the brittle compact as claimed in claim 2, wherein said solidification assistant is impregnated in concentrations of 2 to 30 wt %.

4. The method for producing the brittle compact as claimed in claim 1, wherein said cotton-like aggregates are those adjusted for the content of water to not more than 50 wt % and for the content of oil to not more than 10 wt %.

5. The method for producing the brittle compact as claimed in claim 1, wherein said brittle compact is adjusted for the content of water to 2 to 12 wt % and for the content of oil to 1 to 5 wt %.

6. The method for producing the brittle compact as claimed in claim 1, wherein said grinding chips are those containing not less than 0.2 wt % of carbon.

7. A method for producing an iron-based powder material comprising the steps of:

compression molding cotton-like aggregates including grinding chips from an iron-based metal and a grinding fluid containing oil and water thereby forming a brittle compact having the grinding chips roughly sheared and excessive water and oil removed therefrom; and crushing the brittle compact for further finely shearing the grinding chips, thereby producing the powder material containing the iron-based powder and oil, wherein a solidification assistant is admixed at the time when or after said brittle compact is crushed.

8. The method for producing the iron-based powder material as claimed in claim 7, wherein said solidification assistant is at least one selected from the group consisting of rice polishings, blackstrap molasses, starches, calcined lime, coloidal silica, silicate of soda, aluminum phosphate, vinyl acetate sludge, asphalt emulsion and bentonite.

9. The method for producing the iron-based powder material as claimed in claim 8, wherein said solidification assistant is admixed in concentrations of 2 to 30 wt %.

10. The method for producing the iron-based powder material as claimed in claim 7, wherein coke is admixed at the time when or after said brittle compact is crushed.

11. The method for producing the iron-based powder material as claimed in claim 10, wherein said solidification assistant is admixed in concentrations of 1 to 10 wt %.

12. The method for producing the iron-based powder material as claimed in claim 10, wherein said coke is admixed in concentrations of 5 to 50 wt %.

13. The method for producing the iron-based powder material as claimed in claim 7, wherein recovery dusts collected in a steelmaking process are admixed at the time when or after said brittle compact is crushed.

14. The method for producing the iron-based powder material as claimed in claim 13, wherein said recovery dusts are admixed in concentrations of 10 to 30 wt %.

15. The method for producing the iron-based powder material as claimed in claim 7, wherein said cotton-like aggregates are those adjusted for the content of water to not more than 50 wt % and for the content of oil to not more than 10 wt %.

16. The method for producing the iron-based powder material as claimed in claim 7, wherein said brittle compact is adjusted for the content of water to 2 to 12 wt % and for the content of oil to 1 to 5 wt %.

17. The method for producing the iron-based powder material as claimed in claim 7, wherein said grinding chips are those containing not less than 0.2 wt % of carbon.

18. The method as claimed in claim 1, wherein the grinding chips are fibrous grinding chips.

19. The method as claimed in claim 7, wherein the grinding chips are fibrous grinding chips.

* * * * *